No. 818,911. PATENTED APR. 24, 1906.
C. E. PALMER.
NUT LOCK.
APPLICATION FILED AUG. 17, 1905.

Witnesses
F. J. Singleton
L. B. Weinman

Inventor
C. E. Palmer,
By A. L. Jackson,
Attorney.

UNITED STATES PATENT OFFICE.

CLYDE E. PALMER, OF FORT WORTH, TEXAS.

NUT-LOCK.

No. 818,911.      Specification of Letters Patent.      Patented April 24, 1906.

Application filed August 17, 1905. Serial No. 274,599.

*To all whom it may concern:*

Be it known that I, CLYDE E. PALMER, a citizen of the United States, residing at Fort Worth, Texas, have invented a new and Improved Nut-Lock, of which the following is a specification.

This invention relates to a device for locking nuts on bolts so that the nuts will not come off or be knocked from the bolts even by the roughest usage; and the object is to provide an inexpensive lock which is simple in construction and highly efficient in service and which will prevent rattling against the nut and which is provided with a bearing-spring.

Other objects and advantages will be fully explained in the following description, and the invention will be more particularly pointed out in the claims.

Reference is had to the accompanying drawings, which form a part of this application and specification.

Figure 1:
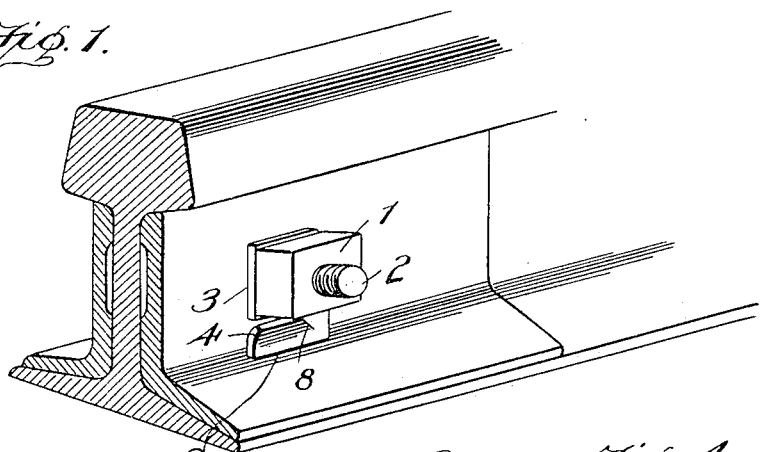
Figure 2:
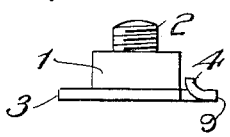
Figure 3:
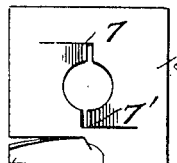
Figure 4:
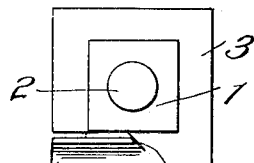
Figure 5:
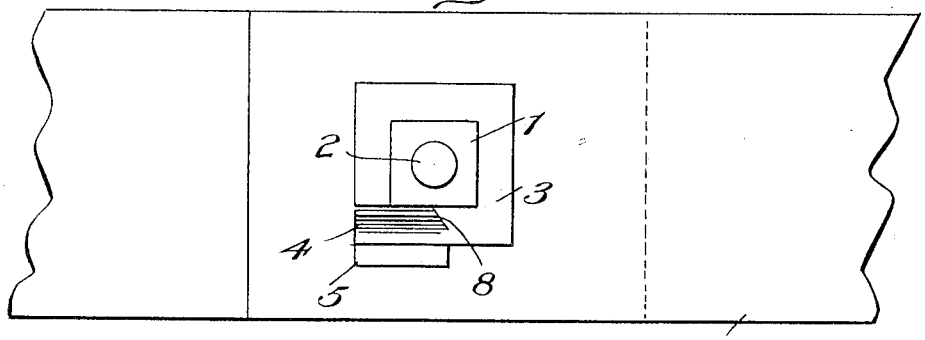
Figure 6:

Figure 1 is a perspective view of a section of a railway-rail and a nut secured on the bolt with one of the improved locks. Fig. 2 is a side elevation of a nut and a locking-washer. Fig. 3 is a plan view of a locking-washer. Fig. 4 is a plan view of a bolt and nut and of a locking-washer. Fig. 5 is a plan view of a locking-washer applied on one beam bolted to another beam by means of a nut and bolt. Fig. 6 is a side elevation of a locking-washer.

Similar characters of reference are used to indicate the same parts throughout the several views.

I have provided a nut-lock which is adapted for general use. In Fig. 1 I show the lock in use to lock a nut on a bolt which secures the fish-plates on a rail-joint. A nut 1 is screwed on a bolt 2 and locked thereon by the locking-washer 3, which is provided with a bearing-spring 4. The washer 3 is made of spring metal, and the spring 4 is cut out of the metal of the washer.

The spring 4 is cut from the metal of the washer and bent up from the plane of the washer for a portion of its length, so that a nut will sweep over the spring. The spring will rise behind the nut and prevent backward turning of the nut.

It will be observed that the outer or lower edge 9 of the spring 4 will be substantially on a line with or in the plane of the washer, so that the spring will engage such devices as the fish-plate and the upper edge of the spring will project upward to engage any other suitable projection.

When the locking-washer is used to lock the nuts on fish-plates of railway-rails, the bearing-spring 4 presses against the fish-plate. The lock, however, is capable of general application. In Fig. 5 the bearing-spring 4 presses against a projection 5 on the beam 6. The spring 4 will engage a projection on any surface on which the washer rests, and such projection can always be provided. The washer is provided with tongues 7 and 7', which are struck out of the spring-metal washer and curved outwardly, so that they will engage the nut and exert constant pressure, and thus prevent rattling. When the nut is being screwed on the bolt, the nut will sweep over the bearing-spring 4, and the spring will rebound and stand up by the side of the nut, so that the nut cannot turn backward or off the bolt. The spring thus performs a double function—a lock for the nut and a bearing to engage any projection to prevent the turning of the washer. The tongues 7 and 7' are struck from the hole through the washer on opposite sides thereof and are then curved outwardly, so that the washer will be resilient. The bearing-spring 4 is cut from the washer on a line with a face of the nut to a point opposite the center of the hole through the washer and then cut at an angle to the side or face of the nut, so that when the spring is curved outwardly a slanting edge 8 will be formed thereon. As the nut turns on the bolt the nut will ride on the slanting edge, and thus press the bearing edge down for passage of the nut.

Having fully described my invention, what I claim as new, and desire to secure by Letters Patent, is—

1. In a lock-nut the combination of a spring-metal plate, a bolt, a nut engaging said bolt, and a locking projection, said plate having a spring-bearing struck therefrom and engaging the side of the nut and the locking projection and having resilient tongues bearing against said nut.

2. In a lock-nut, the combination of a bolt, a nut engaging said bolt, a spring-metal plate having a perforation therethrough for said bolt and resilient tongues struck from said plate on opposite sides of said preforation and pressing against said nut, and a locking projection, said plate having a spring-bearing adapted to engage the locking projection and to lock said nut.

3. A lock for nuts comprising a plate of metal having a hole therethrough for the passage of a bolt, and a spring consisting of a tongue struck from said metal and the inner edge thereof bent at an angle to said plate to form a lock for nuts and having the outer edge thereof in the plane of the washer to engage a suitable projection to prevent turning of said plate.

In testimony whereof I set my hand, in the presence of two witnesses, this 7th day of August, 1905.

CLYDE E. PALMER.

Witnesses:
L. B. WEINMAN,
A. L. JACKSON.